United States Patent
Lin

(12) United States Patent (10) Patent No.: US 9,256,756 B2
Lin (45) Date of Patent: Feb. 9, 2016

(54) METHOD OF ENCRYPTION AND DECRYPTION FOR SHARED LIBRARY IN OPEN OPERATING SYSTEM

(71) Applicant: Giga-Byte Technology Co., Ltd., New Taipei (TW)

(72) Inventor: Wei-Cheng Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 13 days.

(21) Appl. No.: 14/188,448

(22) Filed: Feb. 24, 2014

(65) Prior Publication Data

US 2015/0186681 A1 Jul. 2, 2015

(30) Foreign Application Priority Data

Dec. 31, 2013 (TW) .............................. 102149261 A

(51) Int. Cl.
*G06F 11/30* (2006.01)
*G06F 21/62* (2013.01)

(52) U.S. Cl.
CPC .................................. *G06F 21/6209* (2013.01)

(58) Field of Classification Search
CPC . G06F 21/72; G06F 21/10; G06F 2221/2107; H04L 9/08; H04L 63/0428
USPC .......................................................... 713/189
See application file for complete search history.

(56) References Cited

U.S. PATENT DOCUMENTS

| 8,312,431 B1 * | 11/2012 | Moffat et al. .................. 717/126 |
| 2002/0112158 A1 * | 8/2002 | Golchikov .................... 713/164 |
| 2003/0203755 A1 * | 10/2003 | Jackson .......................... 463/42 |

* cited by examiner

*Primary Examiner* — Baotran N To
(74) *Attorney, Agent, or Firm* — Chun-Ming Shih

(57) ABSTRACT

A method of encryption and decryption for shared libraries in an open operating system is provided. By encrypting a partial portion of an executable and linkable format (ELF) file, where the ELF file is dependent on the shared libraries, an operating system lacking a secret key is not able to use the encrypted ELF file and thus not able to load the shared libraries into the memory for execution, thereby ensuring the protection of the shared libraries.

10 Claims, 7 Drawing Sheets

METHOD OF ENCRYPTION AND DECRYPTION FOR SHARED LIBRARY IN OPEN OPERATING SYSTEM

CROSS REFERENCE TO RELATED APPLICATIONS

This non-provisional application claims priority claim under 35 U.S.C. §119(a) on Patent Application No. 102149261 filed in Taiwan, R.O.C. on Dec. 31, 2013, the entire contents of which are hereby incorporated by reference herein.

BACKGROUND OF THE INVENTION

1. Field of the Invention

The present invention relates to a method of encryption for shared libraries in an open operating system. More particularly, the present invention relates to a method for encrypting a partial portion of an executable and linkable format file in an open operating system so as to ensure protection of the shared libraries.

2. Description of Related Art

FIG. 1 refers to a flowchart illustrating that an open operating system loads and executes shared libraries in the prior art. In the area of computing, a library, especially a shared library, provides an effective way to conserve disk and memory space required for running an application program. A shared library is, in general, a library file which includes a lot of application programming interfaces (API) that can be invoked by external programs and be linked during program execution.

Before a program is executed, the operating system first determines whether the program to be executed is dependent on other shared libraries. As indicated in step 11, if the operating system determines that the program is not dependent on any other shared libraries, the program is executed directly without linking to or loading the shared libraries.

On the other hand, if the operating system determines that the program to be executed is dependent on other shared libraries, the program is first linked with the shared libraries. The operating system then passes the control to the loader by which the shared libraries that the program is dependent on are loaded into the memory, as indicated in step 13. After the dependent libraries are loaded into the memory, the operating system then executes the shared libraries, as indicated in step 15, to complete the process of library loading.

While in practice, it is common that the shared libraries in an open operating system are written by a third party, and users may have to pay to get access to the shared libraries. However, the shared libraries may be subject to stealing by adversaries who may use the libraries without paying, causing some loss to the library payers and providers.

BRIEF SUMMARY OF THE INVENTION

In view of the foregoing, one object of the present invention is to provide a method of encryption for shared libraries in an open operating system. By encrypting a partial portion of an executable and linkable format (ELF, formerly called extensible linking format) file, where the ELF file is dependent on the shared libraries, an operating system and/or a loader, if lacking a secret key, are not able to access the information pertaining to the shared libraries through the encrypted ELF file and thus not able to load the shared libraries into the memory for execution, thereby ensuring the protection of the shared libraries.

Another object of the present invention is to provide a method of encryption for shared libraries in an open operating system, where a partial portion of the ELF file is encrypted to ensure protection of the shared libraries. Since not all of the data in the shared libraries to be protected will be encrypted, the time and system resources needed for data encryption are thus substantially reduced.

Another object of the present invention is to provide a method of encryption for shared libraries in an open system, where the encrypting method first encrypts a partial portion of the ELF file through a random number and subsequently encrypts the random number through a hash number. Optionally, the hash number is stored in a hardware-based security engine for improving the level of security of the ELF file and the shared libraries, and for reducing the risk of being stolen.

Another object of the present invention is to provide a method of decryption for shared libraries in an open operating system. Once the operating system and/or the loader determine that the program to be executed is an encrypted ELF file, the decrypting method decrypts the encrypted ELF file through a secret key (i.e., the random number). After the encrypted ELF file is decrypted, the shared libraries that the ELF file is dependent on are linked and subsequently loaded into the memory for execution.

In sum, the present invention provides a method of encryption for shared libraries in an open operating system, where the shared libraries are dependent libraries that an ELF file requires, and the ELF includes an ELF header, at least one program header table, and at least one segment. The method of encryption includes the step of: encrypting partial portions of the ELF header and the program header table.

In addition to the method of encryption, the present invention provides a method of decryption for shared libraries in an open operating system. The method of decryption includes the steps of: determining that the program to be executed is an encrypted ELF file; decrypting the encrypted ELF file through a random number; and restoring the encrypted ELF file to an ELF file.

According to one embodiment of the method of encryption, the ELF header includes an identification segment.

According to one embodiment of the method of encryption, the method includes the step of: encrypting the portion of the ELF header excluding the identification segment.

According to one embodiment of the method of encryption, the method includes the step of: modifying the identification segment so as to generate a new identification segment different from the previous one.

According to one embodiment of the method of encryption, the segment of the ELF includes a dynamic segment (PT_DYNAMIC).

According to one embodiment of the method of encryption, the method includes the step of: encrypting the dynamic segment (PY_DYNAMIC).

According to one embodiment of the method of encryption, the method includes the steps of: generating a random number; and encrypting partial portions of the ELF header and the program header table through the random number.

According to one embodiment of the method of encryption, the method includes the steps of: providing a string password; performing a hash operation on the string password so as to generate a hash number; and encrypting the random number through the hash number so as to generate an encrypted random number.

According to one embodiment of the method of encryption, the method includes the step of: storing the hash number in a hardware-based security engine.

According to one embodiment of the method of decryption, the method includes the steps of: determining that the program to be executed is an encrypted ELF file; decrypting the encrypted ELF file through a random number; and restoring the encrypted ELF file to an ELF file.

According to one embodiment of the method of decryption, the method includes the step of: decrypting an encrypted random number through a hash number so as to generate the decrypted random number.

According to one embodiment of the method of decryption, the method includes the steps of: transmitting an encrypted random number and an encrypted ELF file to a hardware-based security engine; decrypting the encrypted random number through a hash number stored in the hardware-based security engine so as to generate the decrypted random number; and returning the decrypted ELF file.

BRIEF DESCRIPTION OF THE SEVERAL VIEWS OF DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE PREFERRED EMBODIMENTS

Figure 1:
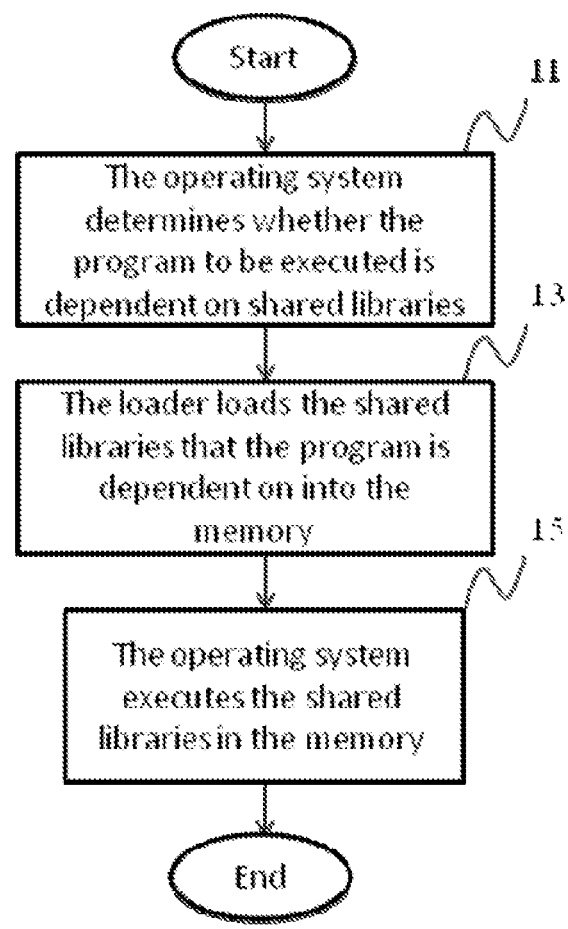
FIG. 1 is a flowchart illustrating that an open operating system loads and executes shared libraries in the prior art.
Figure 2:
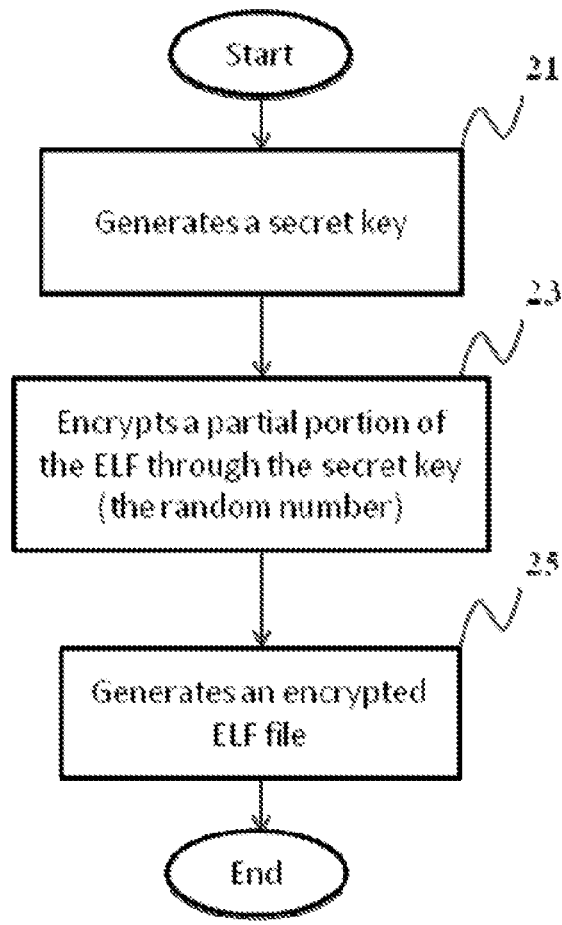
FIG. 2 is a flowchart of a method of encryption for shared libraries in an open operating system according to an embodiment of the present invention.
Figure 3:
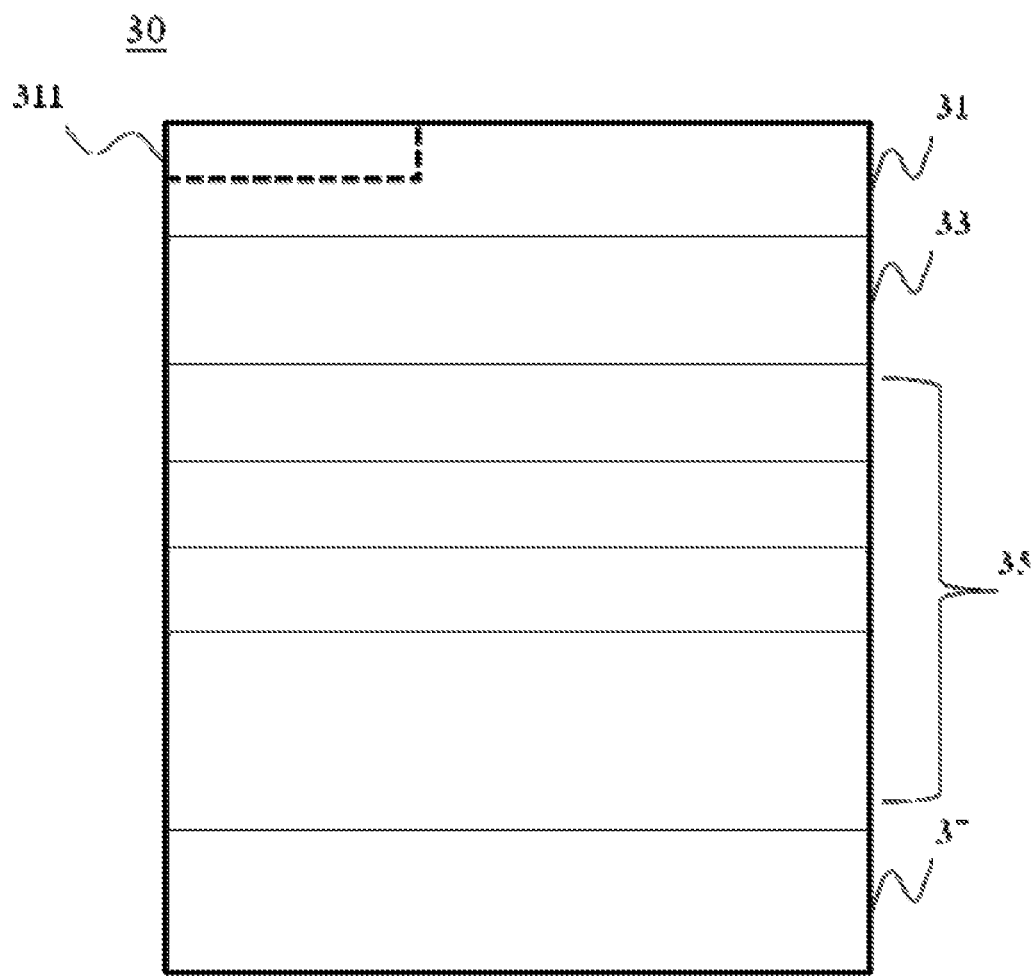
FIG. 3 is a schematic drawing of an executable linkable format according to an embodiment of the present invention.

FIG. 2 shows a flowchart of a method of encryption for shared libraries in an open operating system according to an embodiment of the present invention. The shared libraries are dependent libraries that an ELF file is dependent on. An operating system and/or a loader are able to link the dependent libraries that an ELF file requires. FIG. 3 is a schematic drawing of an ELF according to an embodiment of the present invention, where the ELF 30 is a standard file format for executables, object code, shared libraries, and core dumps. The ELF 30 is extensible and flexible and not bound to any particular processor or architecture, allowing the ELF to be adopted by different operating systems on different platforms.

Referring to FIG. 2 with reference to FIG. 3, the ELF 30 includes an ELF header 31 and subsequent information. In one embodiment of the present invention, the subsequent information includes at least one program header table 33, at least one segment 35, and/or at least one section header table 37.

The ELF header 31 recites relevant information regarding the ELF 30. The information, for example, may include following contents pertaining to a program: ELF file format, ELF type, ELF host machine, ELF version, program's start address, the offset of the program header table 33, the offset of the section header table 37, the size of the ELF header 31, the size and number of the entry of the program header table 33, and the size and number of the entry of the section header table 37.

The program header table 33 recites information for each segment 35, including the segment offset, virtual address, physical address, size in file, size in memory. The section header table 37 recites zero or multiple sections.

Before a program is executed, the operating system determines whether the program is dependent on other shared libraries. The shared libraries will be loaded if the operating system determines that the program to be executed is dependent on the shared libraries. For example, in a Linux operating system, before a program is executed, the operating system first determines, according to the ELF header 31, whether the program to be executed is an ELF 30 file. If the program to be executed is determined to be an ELF 30 file, the system passes the control to the loader by which the dependent libraries that the program requires is loaded into the memory according to the contents of the ELF 30.

In other words, the operating system has to rely on the information of the ELF 30 in order to load the dependent libraries into the memory for execution. The present invention provides a method of encryption for shared libraries in an open operating system. By encrypting a partial portion of the ELF 30, the operating system or the loader, if lacking a secret key, is not able to access the information pertaining to the shared libraries through the encrypted ELF file and thus not able to load the shared libraries into the memory for execution, thereby ensuring the protection of the shared libraries.

In one embodiment of the present invention, as shown in FIG. 2, the method of encryption first generates a secret key, for example, a random number E, as shown in step 21. The method encrypts a partial portion of the ELF 30 through the secret key (the random number E), as shown in step 23, so as to generate an encrypted ELF 30 file, as shown in step 25. The operating system, if lacking a secret key, will not be able to decrypt the encrypted ELF 30 file and thus not be able to load the shared libraries into the memory.

In practical applications, partial portions of the ELF header 31 and the program header table 33 are encrypted through the secret key (the random number E) such that the operating system lacking the secret key is not able to decrypt or access the encrypted ELF 30 file, nor is able to link and load the shared libraries, thereby ensuring the protection of the shared libraries.

In one embodiment of the present invention, as shown in FIG. 3, the ELF header 31 includes an identification segment 311 through which the operating system determines whether the program to be executed is an ELF 30 file. For example, the identification segment 311 may be a magic number. During encryption of the ELF header 31, only the portion of the ELF header excluding the identification segment 311 is encrypted. Therefore, the operating system is able to recognize whether the program is of an ELF 30 by checking the unencrypted identification segment 311.

In one embodiment of the present invention, the identification segment 311 may be modified and changed to an updated identification segment, for example, changing from "ELF" to "SLF." After reading the updated identification segment, the operating system and/or the loader determine that the ELF file is an encrypted ELF 30 file. As long as the secret key (the random number E) is available, the operating system and/or the loader are able to decrypt the encrypted ELF 30 file. For example, the operating system decrypts the encrypted ELF header 31 and the program header table 33 through the secret key (the random number E).

In one embodiment of the present invention, the segment 35 includes a dynamic segment (PT_DYNAMIC), where the dynamic segment includes information required for dynamic linking In practical applications, not only the partial portions of the ELF header 31 and the program header table 33 are encrypted, but also are the dynamic segment, and therefore the level of security of the shared libraries is further increased.

Figure 4:
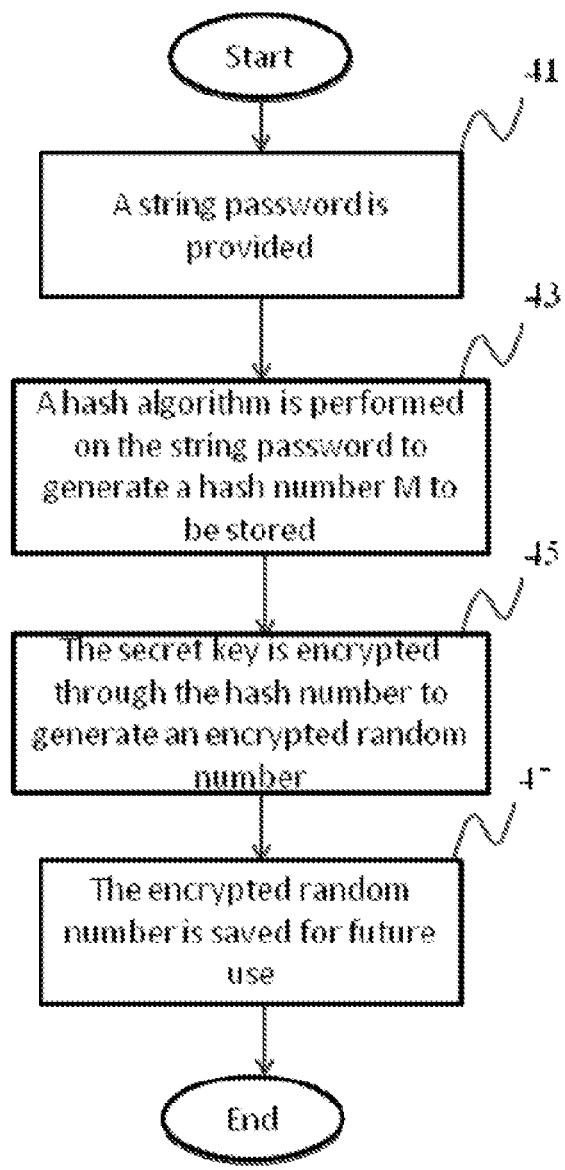
FIG. 4 is a flowchart of a method for encrypting a secret key (a random number) according to an embodiment of the present invention.

FIG. 4 shows a flowchart of a method for encrypting a secret key (a random number E) according to an embodiment of the present invention. The embodiment of the present invention, as shown in FIG. 2, illustrates a method for encrypting the ELF 30 file through a secret key (a random number E) so as to ensure protection of the shared libraries. The operating system, if lacking the secret key, is not able to load and use the shared libraries according to the ELF 30. Therefore, in one embodiment of the present invention, the secret key (the random number E) is further encrypted to increase the level of security of the shared libraries, as indicated in FIG. 4.

In one embodiment of the method for encrypting the secret key (the random number E), a string password S is first provided. The string password S is provided and defined only once, as indicated in step 41. A secure hash algorithm (SHA) is performed on the string password S to generate a hash number M to be stored for future use, as indicated in step 43. For example, a SHA-256 algorithm may be applied to the string password S to generate a 32-bit hash number.

After the hash number M is generated, the secret key is further encrypted through the hash number M; for example, the secret key (the random number E) is encrypted through the hash number M to generate an encrypted random number e, as indicated in step 45. The encrypted random number e is saved for future use; for example, the encrypted random number e may be compiled into a dynamic loader, as indicated in step 47.

In one embodiment of the method of encryption, in addition to encrypting a partial portion of the ELF 30 through the random number E, the method further encrypts the random number E into an encrypted random number e through the hash number M. With the random number E being encrypted, even a third party has the encrypted random number e, he/she still cannot decrypt the encrypted ELF 30 file through the encrypted random number e. Therefore, the level of security of the ELF 30 file and/or the dependent shared libraries are increased.

Figure 5:
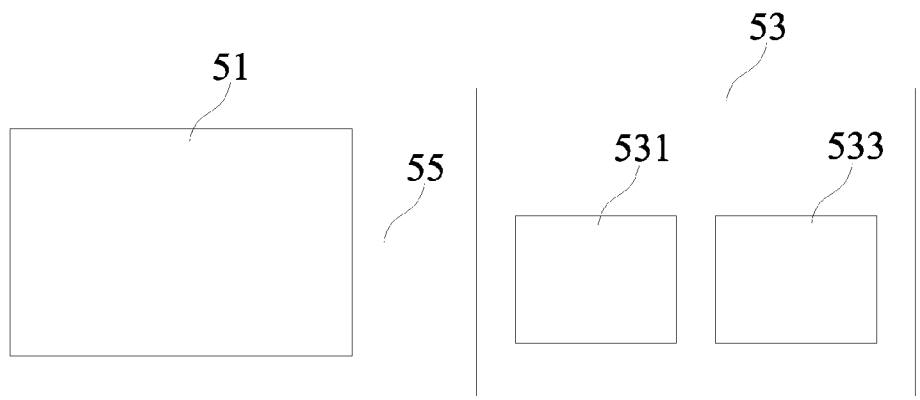
FIG. 5 is a block diagram of a system chip connecting to a hardware-based security engine according to an embodiment of the present invention.
Figure 6:
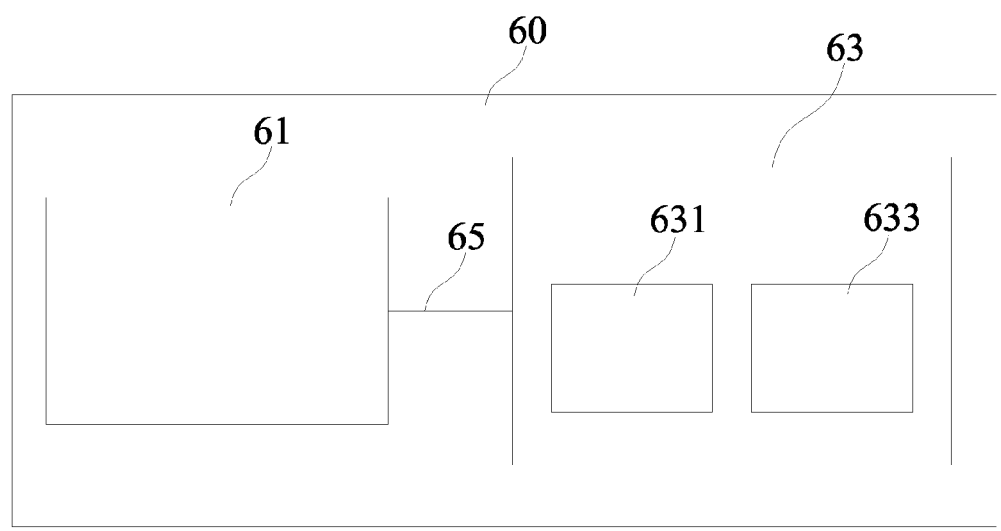
FIG. 6 is a block diagram of a system chip with a hardware-based security engine according to an embodiment of the present invention.

In one embodiment of the present invention, as shown in FIG. 5, a system chip 51 is connected to a hardware-based security engine 53 via an I/O interface 55, where the hardware-based security engine 53 manages and/or stores the hash number M. In one embodiment of the present invention, as shown in FIG. 6, the hardware-based security engine 63 is integrated in a system chip 60, where the hardware-based security engine 63 is connected to a central processing unit (CPU) 61 via an I/O interface 65, and the hardware-based security engine 63 manages and/or stores the hash number M.

With the hardware-based security engines 53/63, the level of security of the secret key (random number), the ELF 30 file, and/or the shared libraries are further increased, and the risk of being stolen for the secret key (random number) is also reduced. In one embodiment of the present invention, the hardware-based security engines 53/63 may include memory units 531/631 and operating units 533/633. In practical applications, the hash number M is stored in the hardware-based security engines 53/63, for example, in the memory units 531/631, and the encrypted random number e is compiled into the loader. During decrypting, the encrypted random number e and/or the encrypted ELF 30 file are transmitted to the hardware-based security engines 53/63, and the encrypted random number e and/or the encrypted ELF 30 file are decrypted through the hash number M, where the hash number M is stored in the hardware-based security engines 53/63.

Figure 7:
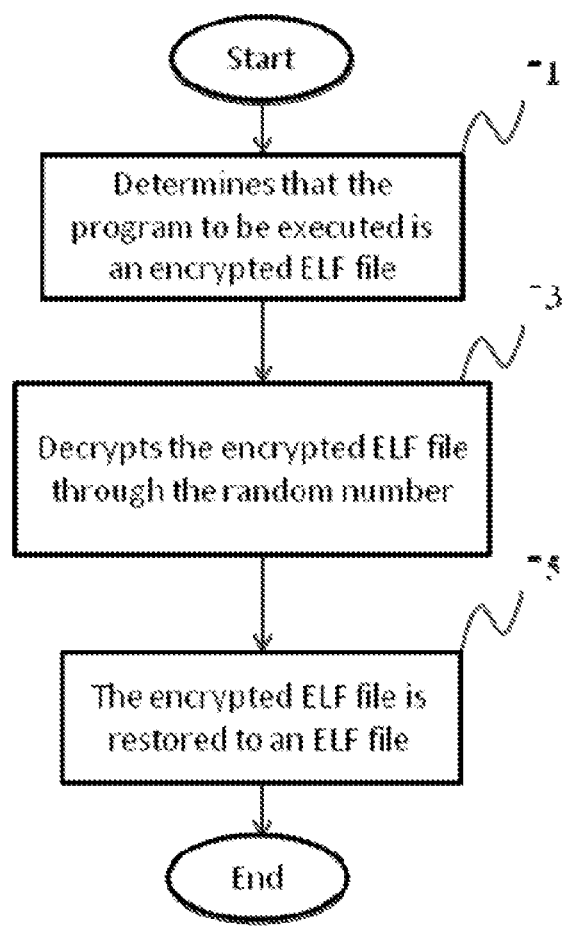
FIG. 7 is a flowchart of a method of decryption for shared libraries in an open operating system according to an embodiment of the present invention.

FIG. 7 shows a flowchart of a method of decryption for shared libraries in an open operating system according to an embodiment of the present invention. Referring to FIG. 7 with further reference to FIG. 3, the operating system and/or the loader determine that the program to be executed is an encrypted ELF 30 file according to the identification segment 311 of the ELF 30, for example, the magic number. For example, the operating system and/or the loader determine that the program to be executed is an encrypted ELF 30 file according to the identification segment of the ELF 30, which is "SLF," as shown in step 71.

After determining that the ELF 30 file is an encrypted file, the operating system and/or the loader decrypt the encrypted ELF 30 file through the random number E, as indicated in step 73. After being decrypted, the encrypted ELF 30 file is restored to an ELF 30 file, as indicated in step 75. The operating system and/or the loader are able to link the dependent libraries according to the ELF 30 and load the shared libraries that the ELF 30 file is dependent on into the memory for execution.

Figure 8:
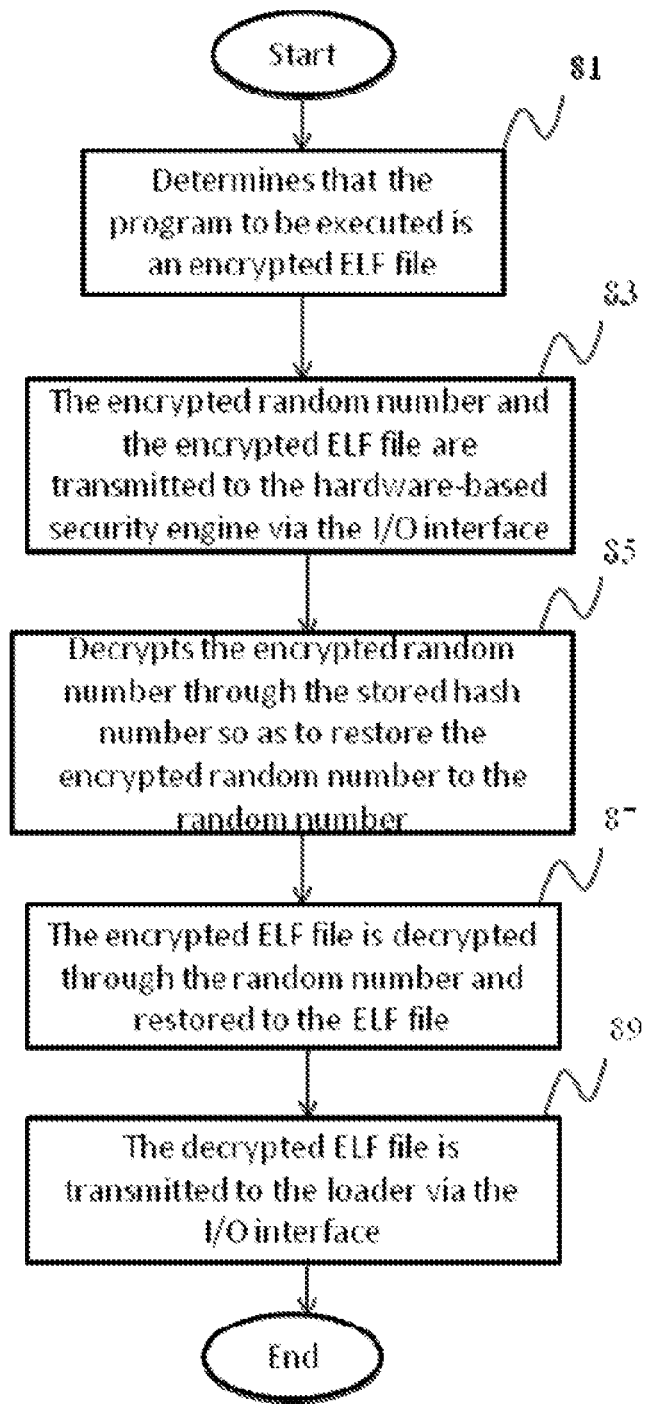
FIG. 8 is a flowchart of a method of decryption for shared libraries in an open operating system according to another embodiment of the present invention.

FIG. 8 shows a flowchart of a method of decryption for shared libraries in an open operating system according to another embodiment of the present invention. Referring to FIG. 8 with reference to FIGS. 3, 5, and 6, the ELF 30 file is encrypted through the random number E, and the random number E is encrypted through the hash number M so as to generate the encrypted random number e. By storing the hash number M, through which the random number E is encrypted, in the hardware-based security engines 53/63, the level of security of the random number E, the ELF 30 file and/or the shared libraries are increased, and the risk of being misappropriated of the shared libraries is thus reduced, which may be caused by stealing of the random number E.

In the present embodiment of the method of decryption, the operating system and/or the loader determine that the program to be executed is an encrypted ELF 30 file according to the identification segment 311 of the ELF 30, for example, the magic number. For example, the operating system and/or the loader determine that the program to be executed is an encrypted ELF 30 file according to the identification segment of the ELF 30, which is "SLF," as shown in step 81.

After the operating system and/or the loader determine that the ELF 30 file is an encrypted file, the encrypted random number e and the encrypted ELF 30 file are transmitted to the hardware-based security engines 53/63 via the I/O interfaces 55/65, as shown in step 83. The hardware-based security engines 53/63 decrypt the encrypted random number e through the stored hash number M so as to restore the encrypted random number e to the random number E, as shown in step 85.

After the random number E is restored, the encrypted ELF 30 file is decrypted through the random number E and restored to the ELF 30 file, as shown in step 87. The decrypted ELF 30 file is transmitted to the loader via the I/O interfaces 55/65, as shown in step 89. After receiving the ELF 30 file, the loader loads the dependent libraries that the ELF 30 file requires into the memory for execution.

The term of "connecting" or "connected" in the description refers to any object/device that is directly or indirectly in connection to another object/device, where the two objects/ devices that are in connection may contain zero or multiple other objects/devices in between.

Please note that terms such as "may," "have to," and "changed" recited herein shall not be treated as a limitation of the present invention, and all other terminology used in the description is to describe related embodiments of the present invention and nor shall be treated as a limitation of the present invention. In the description of the present invention, a singular noun form (e.g., "a" or "one") may also refer to a plural noun form; for example, an object/device used herein may refer to a combination of objects/devices containing two, or more than two, objects/devices.

The foregoing embodiments are illustrative of the characteristics of the present invention so as to enable those skilled in the art to understand the disclosed subject matter and implement the present invention accordingly. The exemplary embodiments, however, are not intended to restrict the scope of the present invention. Hence, all equivalent modifications and variations made in the foregoing embodiments without departing from the spirit and principles of the present invention should fall within the scope of the appended claims.

What is claimed is:

1. A method of encryption for shared libraries in an open operating system, wherein said shared libraries are dependent libraries, said method of encryption performed by the operating system of a computer comprising:
   providing, by the computer, an executable and linkable format (ELF) file that is dependent on the dependent libraries, said ELF file including an ELF header, at least one program header table and at least one segment, wherein said ELF header includes an identification segment and at least a portion, and said identification segment includes a magic number; and
   encrypting, by the computer, the portion of said ELF header excluding said identification segment and further encrypting said at least one program header table.

2. The method of encryption as of claim 1, further comprising:
   modifying said identification segment so as to generate an updated identification segment.

3. The method of encryption as of claim 1, wherein said at least one segment includes a dynamic segment (PT_DYNAMIC).

4. The method of encryption as of claim 3, further comprising:
   encrypting said dynamic segment (PT_DYNAMIC).

5. The method of encryption as of claim 1, further comprising the steps of:
   generating a random number; and
   encrypting partial portions of said ELF header and said at least one program header table through said random number.

6. The method of encryption as of 5, further comprising the steps of:
   providing a string password;
   performing a hash operation on said string password so as to generate a hash number; and
   encrypting said random number through said hash number so as to generate an encrypted random number.

7. The method of encryption as of claim 6, further comprising:
   storing said hash number in a hardware-based security engine.

8. A method of decryption for shared libraries in an open operating system, said method of decryption performed by the operating system of a computer comprising the steps of:
   determining, by the computer, that a program to be executed is an encrypted executable and linkable format (ELF) file, where a portion of an ELF header of the ELF file excluding an identification segment is encrypted, and at least one program header table of the said ELF file is encrypted, wherein the identification segment includes a magic number;
   decrypting, by the computer, the encrypted ELF file through a random number; and restoring, by the computer, the encrypted ELF file to an ELF file that is decrypted.

9. The method of decryption as of claim 8, further comprising:
   decrypting an encrypted random number through a hash number so as to generate said random number.

10. The method of decryption as of claim 8, further comprising the steps of:
    transmitting an encrypted random number and the encrypted ELF file to a hardware-based security engine;
    decrypting said encrypted random number through a hash number stored in said hardware-based security engine so as to generate said random number; and
    returning said ELF file that is decrypted.

* * * * *